United States Patent
Johnson et al.

(10) Patent No.: US 12,163,459 B2
(45) Date of Patent: Dec. 10, 2024

(54) FLOW SHARING CONTROL FOR MULTIPLE HYDRAULIC FAN MOTORS

(71) Applicant: Caterpillar SARL, Geneva (CH)

(72) Inventors: Steven Johnson, Metamora, IL (US); Adam J. Adeeb, Seaham (GB); Samantha L. Sergott, Dunlap, IL (US); Umakanth Sakaray, Dunlap, IL (US)

(73) Assignee: Caterpillar SARL, Geneva (CH)

( * ) Notice: Subject to any disclaimer, the term of this patent is extended or adjusted under 35 U.S.C. 154(b) by 261 days.

(21) Appl. No.: 17/911,187

(22) PCT Filed: Mar. 2, 2021

(86) PCT No.: PCT/EP2021/025088
§ 371 (c)(1),
(2) Date: Sep. 13, 2022

(87) PCT Pub. No.: WO2021/180364
PCT Pub. Date: Sep. 16, 2021

(65) Prior Publication Data
US 2023/0167760 A1    Jun. 1, 2023

(30) Foreign Application Priority Data
Mar. 13, 2020  (GB) ...................................... 2003687

(51) Int. Cl.
*F01P 7/04*  (2006.01)
*B60K 11/04*  (2006.01)
(Continued)

(52) U.S. Cl.
CPC .............. *F01P 7/044* (2013.01); *B60K 11/04* (2013.01); *F01P 5/04* (2013.01)

(58) Field of Classification Search
CPC ......... B60K 11/00; B60K 11/02; B60K 11/04; B60K 11/06; F01P 7/044; F01P 5/04;
(Continued)

(56) References Cited

U.S. PATENT DOCUMENTS 6,463,891 B2    10/2002  Algrain et al.
8,356,479 B2 *   1/2013  Essig .................. F16H 61/4035
                                                          60/484
(Continued)

FOREIGN PATENT DOCUMENTS

CN    101892894 A    11/2010
CN    207848004 U     9/2018
(Continued)

OTHER PUBLICATIONS

International Search Report related to Application No. PCT/EP2021/025088; reported on Apr. 23, 2021.
(Continued)

*Primary Examiner* — Grant Moubry

(57) ABSTRACT

Two cooling fans acting on different heat exchangers may be driven via parallel circuits from a variable displacement hydraulic pump. At least one of the circuits includes a two position valve operable by a control system to vary the flow resistance of the circuit to share the flow between the two fan motors responsive to the relative heat load on the heat exchangers. The pump displacement is controlled to provide a constant hydraulic output pressure irrespective of the operational state of the or each valve assembly.

12 Claims, 1 Drawing Sheet

(51) Int. Cl.
*B60K 11/06* (2006.01)
*F01P 5/04* (2006.01)

(58) Field of Classification Search
CPC ....... F01P 2005/025; F04B 1/32; F04B 49/06; F04B 49/225; B60T 5/00
See application file for complete search history.

(56) References Cited

U.S. PATENT DOCUMENTS

| | | | |
|---|---|---|---|
| 9,518,594 B1 * | 12/2016 | Liao | .................... F15B 21/0423 |
| 2012/0020811 A1 | 1/2012 | Kraeutier et al. | |
| 2012/0057989 A1 | 3/2012 | Cho | |
| 2015/0352944 A1 | 12/2015 | Hoffmann et al. | |
| 2016/0245149 A1 | 8/2016 | Johnson | |
| 2018/0086174 A1 * | 3/2018 | Bidner | ............... B60H 1/00271 |
| 2019/0270435 A1 * | 9/2019 | Matsuura | ............ F16H 63/3441 |

FOREIGN PATENT DOCUMENTS

| | | |
|---|---|---|
| DE | 102007058534 A | 6/2009 |
| EP | 1410938 A2 | 4/2004 |
| JP | H09317465 A | 12/1997 |
| KR | 101565167 B1 | 11/2015 |
| WO | WO-2017204698 A1 * | 11/2017 |

OTHER PUBLICATIONS

Great Britain Search Report related to Application No. 2003687.7; reported on Aug. 22, 2020.

* cited by examiner

FLOW SHARING CONTROL FOR MULTIPLE HYDRAULIC FAN MOTORS

CROSS-REFERENCE TO RELATED APPLICATION

This Application is a 35 USC $371 US National Stage filing of International Application No. PCT/EP2021/025088 filed on Mar. 2, 2021 which claims priority under the Paris Convention to Great Britain Patent Application No. 2003687.7 filed on Mar. 13, 2020.

TECHNICAL FIELD

This disclosure relates to systems for controlling the operation of two or more cooling fans, e.g. for cooling different fluid circuits in a vehicle, wherein the fans are driven by hydraulic motors from a common pump.

BACKGROUND

It is common, particularly in off-road work vehicles, to provide two or more cooling fans driven by hydraulic motors to reject heat via different fluid circuits from the engine or other systems of the vehicle. Such fans may be integrated into a common cooling package comprising two or more heat exchangers. In order to reduce cost and noise it is known to drive both fan motors from a common hydraulic pump.

In such systems it is desirable to control the flow to each fan motor responsive to changes in the cooling demand from each cooling circuit and to parameters affecting heat transfer, for example, changes in air density between different operating environments.

This can be achieved by providing proportional valve control systems for each of the fans, so that the pressure and flow rate to the fan motors can be controlled responsive to the sensed heat load on the cooled circuits and, in more sophisticated systems, optionally also to further sensor input which controls for air density and other environmental variables.

For example, JP H09317465A discloses twin hydraulic fans for cooling, respectively, oil and water circuits of a vehicle. The fan motors are supplied in parallel from a single, variable displacement hydraulic pump. The flow to each fan motor is controlled by a respective 5-way, 3-position throttle valve, which is operable by a controller to vary the flow to the respective motor, and hence the rotational speed of the fan, responsive to sensor input representing the temperature of the respective cooled circuit. The pump is controlled by differential pressure across the throttle valves. A pressure compensation valve is arranged in series with each throttle valve to allow the motors to operate at different driving pressures.

KR 101565167 B1 discloses twin hydraulic fans for cooling, respectively, a hydraulic oil circuit and an engine coolant circuit. The fan motors are supplied in parallel from a single hydraulic pump via a 6-way, 4-position valve with internal orifices. The valve is operable by a controller to share the flow between the two motors responsive to the sensed oil and water temperatures and feedback from fan speed sensors.

Sophisticated, proportional valve control systems often require special valve configurations which, together with their associated sensing systems, add cost and complexity.

SUMMARY OF THE DISCLOSURE

In a first aspect, the present disclosure provides an apparatus including first and second heat exchangers, first and second hydraulic circuits, a hydraulic pump, a first valve assembly, and a control system.

The first hydraulic circuit includes a first hydraulic motor driving a first cooling fan configured to reject heat from the first heat exchanger, while the second hydraulic circuit includes a second hydraulic motor driving a second cooling fan configured to reject heat from the second heat exchanger.

The hydraulic pump has a variable displacement and is configured to supply a flow of hydraulic fluid to the first and second hydraulic circuits. The first and second hydraulic circuits are configured in parallel flow relation to receive the hydraulic fluid from the pump.

The first valve assembly is located in the first hydraulic circuit for controlling the flow of hydraulic fluid through the first hydraulic circuit.

The control system is configured to monitor a heat load to be rejected from at least one of the first and second heat exchangers, and to control the first valve assembly to share the flow of hydraulic fluid from the pump between the first and second hydraulic circuits responsive to the heat load to be rejected.

The first valve assembly includes an inlet, an outlet, a two position valve located between the inlet and the outlet, and at least one flowpath between the inlet and the outlet.

The first valve assembly is operable by the control system to define only two alternative operational states, being respectively a full flow state defined by a first position of the two position valve, and a restricted flow state defined by a second position of the two position valve.

The at least one flowpath permits flow from the inlet to the outlet in both the restricted flow state and the full flow state. A flow resistance of the at least one flowpath is greater in the restricted flow state than in the full flow state.

The control system is further configured to vary the displacement of the pump to control the flow of hydraulic fluid supplied by the pump, to maintain a constant hydraulic output pressure from the pump irrespective of the operational state of the first valve assembly.

In another aspect, the disclosure provides a vehicle including an apparatus as described above, a drive system for driving the vehicle in motion, and a braking system for braking the vehicle.

A first respective one of the first and second heat exchangers is arranged to reject heat generated by the drive system, and a second respective one of the first and second heat exchangers is arranged to reject heat generated by the braking system.

In another aspect, the disclosure provides a method for controlling an apparatus, wherein the apparatus is arranged as described above.

The method includes operating the first valve assembly by the control system to define said only two alternative operational states of the first valve assembly, and configuring the control system to vary the displacement of the pump to maintain a constant hydraulic output pressure from the pump irrespective of the operational state of the first valve assembly.

BRIEF DESCRIPTION OF THE DRAWINGS

Further features and advantages will become apparent from the following illustrative embodiment which will now be described, purely by way of example and without limitation to the scope of the claims, and with reference to the accompanying drawings, in which:

DETAILED DESCRIPTION

Figure 1:
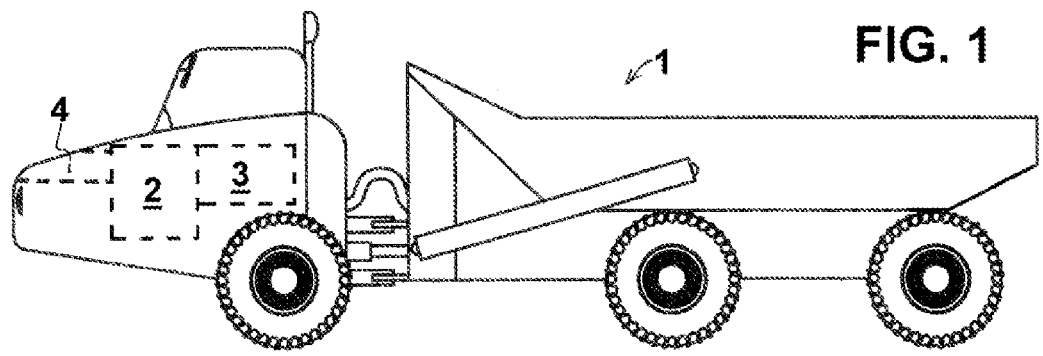
FIG. 1 shows a vehicle.

FIG. 1 shows a vehicle 1 including a drive system 2 for driving the vehicle in motion, a braking system 3 for braking the vehicle, and a cooling system 4 for rejecting heat generated by the drive system and the braking system. The vehicle may be, for example, a dump truck with a tipping body for moving loose material, or may have a work tool articulated to the vehicle body and operable to move material in the vicinity of the vehicle, e.g. a bucket or a grab. By way of example the illustrated vehicle is an articulated dump truck with a tipping body. The drive system 2 may include an internal combustion engine, and may further include a turbocharger for supplying charge air to the engine and/or a hydraulic transmission. The braking system may include an endurance braking system or retarder, which may be operable by the driver or automatically by a control system of the vehicle, e.g. to prevent overspeed of the engine.

Figure 2:
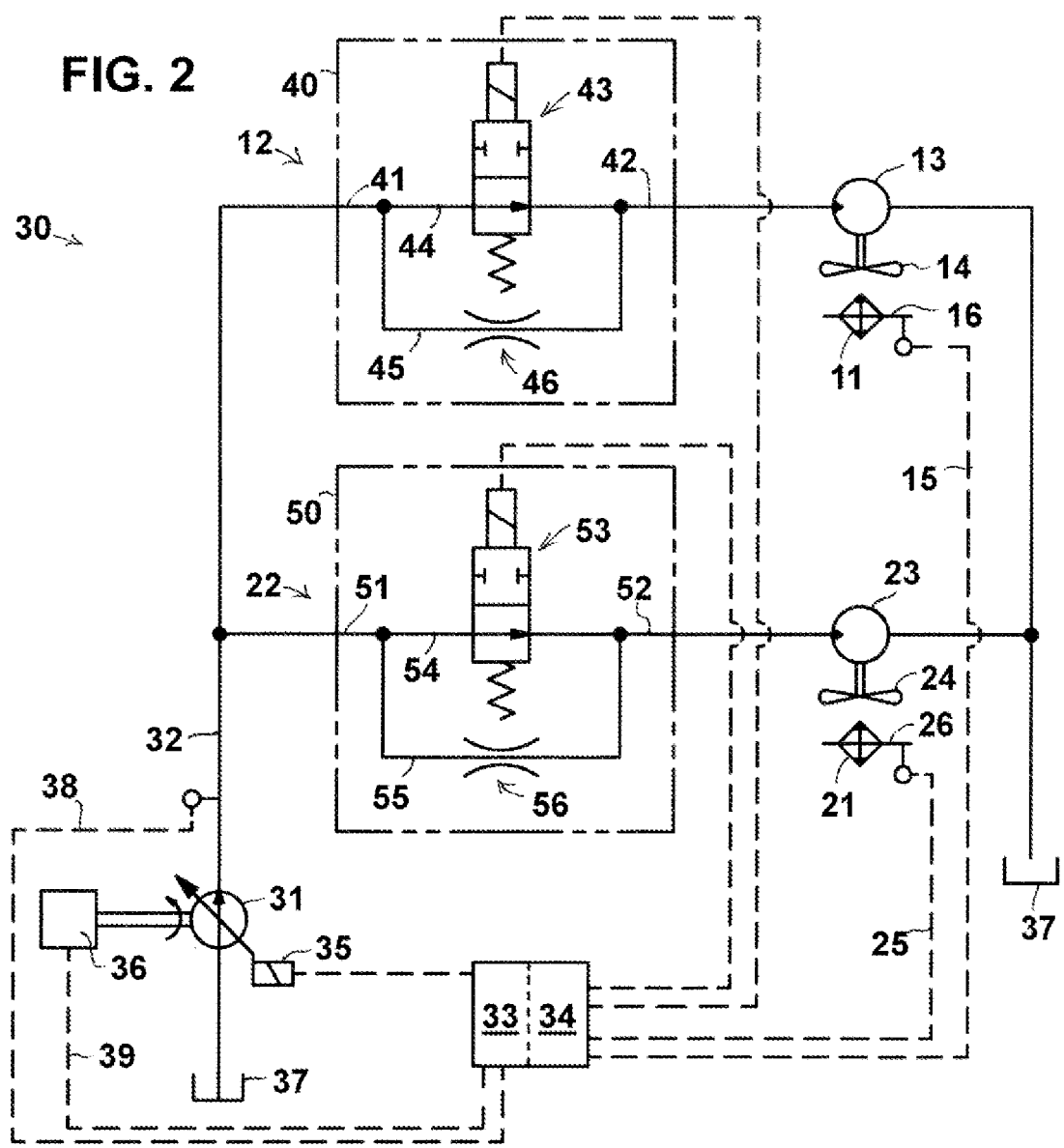
FIG. 2 shows the apparatus as installed in the vehicle.

FIG. 2 shows an apparatus 30 including a first heat exchanger 11 and a second heat exchanger 21. The apparatus 30 may be incorporated into the cooling system of a vehicle, e.g. the cooling system 4 of the vehicle 1, in which case a first respective one of the heat exchangers 11, 21 may be arranged to reject heat generated by the drive system 2 of the vehicle, and a second respective one of the heat exchangers 11, 21 may be arranged to reject heat generated by the braking system 3 of the vehicle.

For example, one of the heat exchangers could be configured as a radiator to reject heat generated by the engine, or as an air-to-air aftercooler to reject heat generated by the turbocharger. The other heat exchanger could be configured for example to reject heat generated by an endurance braking system, which could be transmitted for example via a hydraulic transmission circuit of the vehicle drive system.

The apparatus 30 includes first and second hydraulic circuits 12, 22, a hydraulic pump 31, and a control system 33, 34.

The pump 31 is configured to supply a flow of hydraulic fluid 32 to the first and second hydraulic circuits 12, 22, which are configured in parallel flow relation to receive the flow of hydraulic fluid 32 from the pump 31. Each circuit may conduct the flow from the pump 31 to tank 37.

The fluid displacement of the pump 31 is variable by the control system 33, 34, e.g. via an adjustable swash plate acting on pumping elements of the pump, or otherwise as well known in the art.

The first hydraulic circuit 12 includes a first hydraulic motor 13 driving a first cooling fan 14 configured to reject heat from the first heat exchanger 11 which cools a first fluid circuit 16, while the second hydraulic circuit 22 includes a second hydraulic motor 23 driving a second cooling fan 24 configured to reject heat from the second heat exchanger 21 which cools a second fluid circuit 26. The first and second fluid circuits 16, 26 that pass through the heat exchangers 11, 21 may be fluid circuits of the vehicle drive and braking systems and may carry oil, water, air, or any other fluid to be cooled, optionally including the oil or other hydraulic fluid 32 supplied by the pump 31 to the first and second hydraulic circuits 12, 22. The heat exchangers 11, 21 and cooling fans 14, 24 may be integrated into a single, compact cooling package that is mounted on the vehicle 1 to form part of the vehicle cooling system 4.

A first valve assembly 40 is located in the first hydraulic circuit 12 in fluid series relation with the motor 13 to control the flow of hydraulic fluid through the first hydraulic circuit 12 and motor 13. A second valve assembly 50 may be located in the second hydraulic circuit 22 in fluid series relation with the motor 23 for controlling the flow of hydraulic fluid through the second hydraulic circuit 22 and motor 23. The first and second valve assemblies may be similar or identical in form.

The or each valve assembly 40, 50 may be located upstream of the respective motor 13, 23 as illustrated, or alternatively may be downstream of the respective motor 13, 23.

The or each valve assembly 40, 50 includes an inlet 41, 51, an outlet 42, 52, a two position valve 43, 53 located between the inlet and the outlet, and at least one flowpath 44, 45, 54, 55 between the inlet and the outlet, through which the hydraulic fluid flows to the respective motor 13 or 23. As illustrated, the or each valve assembly 40, 50 may include not more than one respective valve 43 or 53. The or each valve 43, 53 may be a two-way (two-port) valve, and may be a spool valve operable by a solenoid, as illustrated.

The or each valve assembly 40, 50 is operable by the control system 33, 34 to define only two alternative operational states, being respectively a full flow state defined by a first position of the respective two position valve 43 or 53, and a restricted flow state defined by a second position of the two position valve 43 or 53.

In order to ensure that the respective motor 13 or 23 always receives flow from the pump 31 so that the fan 14 or 24 does not stall, the at least one flowpath 44, 45 or 54, 55 permits flow from the inlet 41, 51 to the outlet 42, 52 in both the restricted flow state and the full flow state. The at least one flowpath 44, 45 or 54, 55 provides a flow resistance to the flow of hydraulic fluid from the pump 31 to the motor 13 or 23, which is greater in the restricted flow state than in the full flow state.

A minimum total section area of the at least one flowpath 44, 45 or 54, 55 may be smaller in the restricted flow state than in the full flow state. For this purpose the or each valve assembly 40, 50 may further include a fixed orifice 46, 56 which defines the smaller total section area in the restricted flow state.

In this case the valve 43, 53 may be operable to open and close a flowpath 44, 54 through the valve 43, 53 in parallel with the fixed orifice 46, 56, which defines another flowpath 45, 55 in parallel with the valve 43, 53, as shown. The fixed orifice 46, 56 may be formed in a valve block of the valve 43, 53, e.g. as an orifice plug, or elsewhere, the term "valve assembly" denoting merely the functional connection between the parts of the assembly.

Alternatively a fixed orifice may be incorporated into the two position valve of the or each valve assembly 40, 50, e.g. formed in the valve spool, to define a flowpath between the inlet and outlet 41, 42 or 51, 52 in only one position of the valve.

The first and second hydraulic circuits 12, 22 may be arranged to carry the same maximum flow rate or different maximum flow rates, depending on the power limit of each fan 14, 24 corresponding to the maximum heat dissipation capacity of the respective heat exchangers. By way of example, each fluid circuit 16, 26 might be configured to carry a heat load of about 25-30 kW from the vehicle radiator, or a heat load of about 15-20 kW from the vehicle braking system or air-to-air aftercooler. The fixed orifice of each valve could be for example around 1.5 mm-2 mm, e.g. about 1.8 mm in diameter.

The control system 33, 34 is configured to vary the displacement of the pump 31 to control the flow of hydraulic fluid supplied by the pump to maintain a constant hydraulic output pressure from the pump 31, irrespective of the operational state of the or each valve assembly 40, 50.

That is to say, the hydraulic output pressure produced by the pump 31 at its flow outlet remains the same, (at least while the varying pump displacement causes the hydraulic output volume flow rate from the pump to vary through a range between a lower flow limit and an upper flow limit,) while the operational state of the or each valve assembly 40, 50 changes to vary the flow resistance between its inlet and outlet and hence the flow resistance of the respective hydraulic circuit 12, 22 through the motor 13, 23.

If the flow from the pump rises above the upper flow limit, defined by the maximum power and output capacity of the pump, then a further reduction in the flow resistance of the circuit may cause the pump output pressure to fall. If the flow from the pump falls below the lower flow limit, which may represent a high resistance, fault condition of the circuit, then further increase in the flow resistance of the circuit may cause output pressure to rise to an increased level; the increased level may be limited by an emergency pressure limit control of the pump.

The pump may be configured to maintain said constant hydraulic output pressure up to a maximum hydraulic output volume flow rate of the pump, which may be defined by the maximum rated speed or power output of the pump and/or its prime mover. Each hydraulic motor 13, 23 may be configured to operate at said constant hydraulic output pressure up to a maximum hydraulic volume flow rate of the motor, which may be defined by the maximum rated speed or power of the motor and its respective fan.

At said constant hydraulic output pressure, the maximum hydraulic output volume flow rate of the pump may be greater than the maximum hydraulic volume flow rate of each individual one of the hydraulic motors 13, 23, but less than the combined maximum hydraulic volume flow rate of both of the hydraulic motors 13, 23.

Moreover, where both first and second valve assemblies 40, 50 are provided, the control system may be arranged to control the first and second valve assemblies 40, 50 to provide that, at substantially all times during normal operation of the apparatus, at least one of the first and second valve assemblies is in, or transitioning to, the restricted flow state. This makes it possible to drive both fans from a pump that is too small to supply a maximum flow rate to both fans simultaneously, while ensuring that each of the fans can be driven at its maximum capacity when necessary.

The control system 33, 34 is further configured to monitor a heat load to be rejected from at least one of the first and second heat exchangers 11, 21, e.g. by receiving a temperature signal 15, 25 from a respective sensor of one or each respective fluid circuit 16, 26 that delivers the heat to the heat exchangers, and to control the or each valve assembly 40, 50 to share the flow of hydraulic fluid from the pump 31 between the first and second hydraulic circuits 12, 22 responsive to the heat load to be rejected. If two valve assemblies 40, 50 are provided then the control system 33, 34 may be configured to monitor the heat load on each of the two heat exchangers 11, 21 to control the two valve assemblies.

Since each of the first and second circuits 12, 22 always defines an open flowpath, it will be understood that the or each valve 43, 53 is operable by the control system 33, 34 responsive to changes in the relative heat load between the two circuits 12, 22 to vary the relative proportion of the flow that passes through each circuit 12, 22. Since each circuit 12, 22 always allows flow, each fan 14, 24 will run at either full speed or reduced speed depending on the operational state of the or each valve assembly 40, 50.

Optionally, the control system may be arranged to vary a power input to the pump (which may be a power input either to or from the prime mover 36 that drives the pump) responsive to variations in the heat load to be rejected from either (whichever) respective one of the heat exchangers whose respective cooling fan is driven by a respective one of the hydraulic motors via a respective one of the valve assemblies which is in the full flow state. That is to say, the pump power may be controlled responsive to the demand on the hydraulic motor that is driven in the full flow state.

The full or reduced speed of each motor will vary with the pump displacement, so in this way the pump may provide proportional control to the motor that is running at full speed. Where the apparatus is configured as mentioned above so that at all times at least one of the first and second valve assemblies is in, or transitioning to, the restricted flow state, one motor may thus be controlled to vary its speed proportionally responsive to changing heat load on its respective heat exchanger, up to its maximum rated speed, while the other runs at a reduced speed to prevent it from stalling.

Each fan motor 13, 23 may be a fixed displacement hydraulic motor. The control system 33, 34 may be arranged so that, when one valve assembly 40, 50 is in the full flow state to run the respective fan motor 13 or 23 at full speed, and the other valve assembly is in the restricted flow state, the valve assembly in the full flow state may be adjusted to the restricted flow state before the other valve assembly is adjusted to the full flow state, in order to avoid cavitation in the motor of the fan running at full speed due to the momentum of its fan as the hydraulic pressure falls.

Thus, in one possible sequence of operation, the control system 33, 34 may operate the valves 43, 53 to drive the fan motors alternately at full speed (i.e. motor 13 at full speed and motor 23 at reduced speed, and then vice versa).

The pump 31 may include an electrically powered actuator 35 for varying the displacement of the pump 31 responsive to an electrical control signal from the control system 33, 34.

The control system 33, 34 may be divided into first and second control units, wherein the first control unit 33 is configured to vary the displacement of the pump 31, and the second control unit 34 is configured to monitor the heat load and control the or each valve assembly 40, 50. In this way the novel apparatus may be provided as two separate units, being a variable displacement pump with an integral, hydraulic or electro-hydraulic pump control unit 33 as known in the art, and a second control unit 34 that controls the or each valve assembly 40, 50 independently of the pump control unit 33.

The pump 31 may be a conventional, electro-hydraulic variable displacement pressure control (i.e. torque control) pump as known in the art, with the pump control unit 33 being arranged to send a control signal to the actuator 35, e.g. responsive to a pressure signal 38 indicating the output pressure from the pump 31 or a torque signal 39 indicating torque applied by the prime mover 36 to drive the pump in rotation. Alternatively, the pump 31 may be controlled by a mechanical, e.g. hydraulic pump control unit 33, which may be physically integrated into a housing of the pump 31. The prime mover 36 may be the engine of the vehicle 1 or a separate motor.

The control system 33, 34 may include an electronic control unit, which may form the valve control unit 34 and/or the pump control unit 33, having a processor configured to execute software stored in non-transient memory to generate an output control signal to the or each valve assembly 40, 50 responsive to sensor input.

In summary, two cooling fans 14, 24 acting on different heat exchangers 11, 21 may be driven via parallel circuits 12, 22 from a variable displacement hydraulic pump 31. At least one of the circuits 12, 22 includes a two position valve 43, 53 operable by a control system 33, 34 to vary the flow resistance of the circuit 12, 22 to share the flow between the two fan motors 13, 23 responsive to the relative heat load on the heat exchangers 11, 21. The pump displacement is controlled to provide a constant hydraulic output pressure irrespective of the operational state of the or each valve assembly 40, 50.

In accordance with the novel method of control, the apparatus 30 is arranged as described above, with the or each valve assembly 40, 50 including an inlet 41, 51, an outlet 42, 52, a two position valve 43, 53 located between the inlet and the outlet, and at least one flowpath 44, 45, 54, 55 between the inlet and the outlet. The or each valve assembly 40, 50 is operated by the control system 33, 34 to define only the two alternative operational states of the or each valve assembly, and the control system 33, 34 is configured to vary the displacement of the pump 31 to maintain a constant hydraulic output pressure from the pump irrespective of the operational state of the or each valve assembly 40, 50.

INDUSTRIAL APPLICABILITY

The novel apparatus provides a simple valve system that may be configured for proportional control of each of two or more fan motors driven by a common pump.

In particular, the disclosure recognises that a variable displacement pump can be used in combination with a simple, two-position valve assembly to provide economical, optionally proportional control to each of two or more fan motors while compensating automatically for changes in air density. By varying the displacement of the pump 31 to maintain a constant hydraulic output pressure, the control system 33, 34 adjusts the flow rate from the pump responsive to the flow resistance of the first and second hydraulic circuits 12, 22, which is determined both by the operational state (full or restricted flow) of the or each valve assembly 40, 50, and by the load on the or each fan 14, 24 which varies with the density of the ambient air.

Thus, by proportionally controlling the pump displacement to maintain a constant hydraulic output pressure, the control system 33, 34 adjusts the pump displacement to increase flow to increase fan speed and air flow rate through the heat exchangers 11, 21 responsive to reduced resistance when air density (hence also the cooling capacity of the air) is lower, and to reduce flow to reduce fan speed and air flow rate through the heat exchangers 11, 21 responsive to increased flow resistance when air density (hence also the cooling capacity of the air) is higher.

Similarly, when the or each valve 43, 53 is in the full flow state, the control system 33, 34 responds to the reduced resistance of the parallel hydraulic circuits 12, 22 by increasing flow to maintain constant pressure; conversely, when one of the valves 43, 53 moves (e.g. closes) to define the restricted flow state, increased flow resistance results in reduced flow to maintain constant pressure. Thus, a simple and economical two-position valve system is used to share the flow between the two circuits 12, 22 responsive to variations in their relative heat loads, with constant output pressure automatically adjusting demand responsive to variations in air density, while the pump 31 may additionally provide proportional control that reflects the heat demand from whichever circuit 12, 22 is in the full flow state.

The novel arrangement may be applied in particular to a vehicle in which a first respective one of the first and second heat exchangers is arranged to reject heat generated by the drive system 2, and a second respective one of the first and second heat exchangers is arranged to reject heat generated by the braking system 3.

In this respect, the disclosure further recognises that since heat loads generated by the braking system and the internal combustion engine or other drive system of the vehicle will fluctuate approximately in antiphase, the simple two-position valve assembly can be controlled to maintain a respective one of the hydraulic circuits 12, 22 in a full flow state and the other in a restricted flow state, so as to prioritise the flow from the common pump 31 to supply power to the fan 14 or 24 that rejects heat from whichever respective one of the drive and braking systems 2, 3 is active at any given time.

The novel apparatus may be incorporated, for example, into any vehicle that requires heat to be rejected from more than one fluid circuit.

Although the illustrated embodiment provides only two parallel, first and second hydraulic circuits 12, 22, more than two parallel circuits 12, 22 could be arranged with one, two or more valve assemblies 40, 50, each valve assembly being located in a respective one of the parallel circuits, to share the flow from a common pump 31 in a similar way.

Many further adaptations are possible within the scope of the claims.

In the claims, reference numerals are provided in parentheses, purely for ease of reference, and should not be construed as limiting features.

The invention claimed is:

1. An apparatus including:
   first and second heat exchangers;
   a first hydraulic circuit including a first hydraulic motor driving a first cooling fan configured to reject heat from the first heat exchanger;
   a second hydraulic circuit including a second hydraulic motor driving a second cooling fan configured to reject heat from the second heat exchanger;
   a hydraulic pump having a variable displacement and configured to supply a flow of hydraulic fluid to the first and second hydraulic circuits, the first and second hydraulic circuits being configured in parallel flow relation to receive the hydraulic fluid from the pump;
   a first valve assembly located in the first hydraulic circuit for controlling the flow of hydraulic fluid through the first hydraulic circuit; and
   a control system configured:
     to vary the displacement of the pump to control the flow of hydraulic fluid supplied by the pump,
     to monitor a heat load to be rejected from at least one of the first and second heat exchangers, and
     to control the first valve assembly to share the flow of hydraulic fluid from the pump between the first and second hydraulic circuits responsive to the heat load to be rejected;
   wherein the first valve assembly includes an inlet, an outlet, a two position valve located between the inlet and the outlet, and at least one flowpath between the inlet and the outlet; and the first valve assembly is operable by the control system to define only two alternative operational states, being respectively a full flow state defined by a first position of the two position valve, and a restricted flow state defined by a second position of the two position valve, wherein the at least one flowpath permits flow from the inlet to the outlet in both the restricted flow state and the full flow state, and wherein a flow resistance of the at least one flowpath is greater in the restricted flow state than in the full flow state; and wherein the control system is configured to vary the displacement of the pump to maintain a constant hydraulic output pressure from the pump irrespective of the operational state of the first valve assembly.

2. The apparatus according to claim 1, wherein the first valve assembly includes a fixed orifice, said valve being operable to open and close a flowpath through said valve in parallel with the fixed orifice.

3. The apparatus according to claim 1, wherein said valve is a two-way valve.

4. The apparatus according to claim 1, wherein the control system is divided into first and second control units, the first control unit configured to vary the displacement of the pump, the second control unit configured to monitor the heat load and control the first valve assembly.

5. The apparatus according to claim 1, wherein the pump includes an electrically powered actuator for varying the displacement of the pump responsive to an electrical control signal from the control system.

6. The apparatus according to claim 1, further including a second valve assembly located in the second hydraulic circuit for controlling the flow of hydraulic fluid through the second hydraulic circuit;

the second valve assembly including an inlet, an outlet, a two position valve located between its inlet and outlet, and at least one flowpath between its inlet and outlet; and the second valve assembly is operable by the control system to define only two alternative operational states, being respectively a full flow state defined by a first position of its two position valve, and a restricted flow state defined by a second position of its two position valve, wherein its at least one flowpath permits flow from its inlet to its outlet in both its restricted flow state and its full flow state, and a flow resistance of its at least one flowpath is greater in its restricted flow state than in its full flow state;

wherein the control system is configured;
to monitor a heat load to be rejected from each of the first and second heat exchangers, and
to control each of the first and second valve assemblies to share the flow of hydraulic fluid from the pump between the first and second hydraulic circuits responsive to the heat load to be rejected, and
to vary the displacement of the pump to maintain a constant hydraulic output pressure from the pump irrespective of the operational state of each of the first and second valve assemblies.

7. The apparatus according to claim 6, wherein the pump is configured to maintain said constant hydraulic output pressure up to a maximum hydraulic output volume flow rate of the pump; and each hydraulic motor is configured to operate at said constant hydraulic output pressure up to a maximum hydraulic volume flow rate of the motor; and at said constant hydraulic output pressure, the maximum hydraulic output volume flow rate of the pump is greater than the maximum hydraulic volume flow rate of each individual one of the hydraulic motors, but less than the combined maximum hydraulic volume flow rate of both of the hydraulic motors; and the control system is arranged to control the first and second valve assemblies to provide that, at substantially all times during normal operation of the apparatus, at least one of the first and second valve assemblies is in, or transitioning to, the restricted flow state.

8. The apparatus according to claim 7, wherein the control system is arranged to vary a power input to the pump responsive to variations in the heat load to be rejected from either respective one of the heat exchangers whose respective cooling fan is driven by a respective one of the hydraulic motors via a respective one of the valve assemblies which is in the full flow state.

9. The apparatus according to claim 6, wherein each valve assembly includes a respective fixed orifice, the respective valve of each valve assembly being operable to open and close a flowpath through said respective valve in parallel with the respective fixed orifice.

10. The apparatus according to claim 6, wherein each valve is a two-way valve.

11. A vehicle including;
an apparatus according to any preceding claim,
a drive system for driving the vehicle in motion, and
a braking system for braking the vehicle;
wherein a first respective one of the first and second heat exchangers is arranged to reject heat generated by the drive system, and a second respective one of the first and second heat exchangers is arranged to reject heat generated by the braking system.

12. A method for controlling an apparatus including:
first and second heat exchangers;
a first hydraulic circuit including a first hydraulic motor driving a first cooling fan configured to reject heat from the first heat exchanger;
a second hydraulic circuit including a second hydraulic motor driving a second cooling fan configured to reject heat from the second heat exchanger;
a hydraulic pump having a variable displacement and configured to supply a flow of hydraulic fluid to the first and second hydraulic circuits, the first and second hydraulic circuits being configured in parallel flow relation to receive the hydraulic fluid from the pump;
a first valve assembly located in the first hydraulic circuit for controlling the flow of hydraulic fluid through the first hydraulic circuit; and
a control system configured:
to vary the displacement of the pump to control the flow of hydraulic fluid supplied by the pump,
to monitor a heat load to be rejected from at least one of the first and second heat exchangers, and
to control the first valve assembly to share the flow of hydraulic fluid from the pump between the first and second hydraulic circuits responsive to the heat load to be rejected;

the method including:
arranging the first valve assembly to include an inlet, an outlet, a two position valve located between the inlet and the outlet, and at least one flowpath between the inlet and the outlet, and
operating the first valve assembly by the control system to define only two alternative operational states of the first valve assembly, being respectively a full flow state defined by a first position of the two position valve, and a restricted flow state defined by a second position of the two position valve, wherein the at least one flowpath permits flow from the inlet to the outlet in both the restricted flow state and the full flow state, and wherein a flow resistance of the at least one flowpath is greater in the restricted flow state than in the full flow state; and configuring the control system to vary the displacement of the pump to maintain a constant hydraulic output pressure from the pump irrespective of the operational state of the first valve assembly.

* * * * *